United States Patent
Nascimbene (10) Patent No.: US 12,440,649 B2
(45) Date of Patent: Oct. 14, 2025

(54) SYSTEMS AND METHODS FOR TREATING CHRONIC TOTAL OCCLUSION OF AN ARTERY

(71) Applicant: THE BOARD OF REGENTS OF THE UNIVERSITY OF TEXAS SYSTEM, Austin, TX (US)

(72) Inventor: Angelo Nascimbene, Austin, TX (US)

(73) Assignee: THE BOARD OF REGENTS OF THE UNIVERSITY OF TEXAS SYSTEM, Austin, TX (US)

(*) Notice: Subject to any disclaimer, the term of this patent is extended or adjusted under 35 U.S.C. 154(b) by 1103 days.

(21) Appl. No.: 17/298,997

(22) PCT Filed: Dec. 3, 2019

(86) PCT No.: PCT/US2019/064324
§ 371 (c)(1),
(2) Date: Jun. 2, 2021

(87) PCT Pub. No.: WO2020/117865
PCT Pub. Date: Jun. 11, 2020

(65) Prior Publication Data
US 2022/0047851 A1 Feb. 17, 2022

Related U.S. Application Data

(60) Provisional application No. 62/774,377, filed on Dec. 3, 2018.

(51) Int. Cl.
*A61M 25/01* (2006.01)
*A61F 2/86* (2013.01)
(Continued)

(52) U.S. Cl.
CPC .......... *A61M 25/0158* (2013.01); *A61F 2/86* (2013.01); *A61M 25/09* (2013.01); *A61M 2025/0042* (2013.01)

(58) Field of Classification Search
CPC .............. A61M 25/0158; A61M 25/09; A61M 2025/0042; A61M 2025/0197; A61F 2/86
See application file for complete search history.

(56) References Cited

U.S. PATENT DOCUMENTS 5,772,609 A * 6/1998 Nguyen ................ A61M 25/09
600/585
6,186,986 B1 * 2/2001 Berg .................. A61M 25/0054
604/524

(Continued)

FOREIGN PATENT DOCUMENTS

| WO | 99/04725 A1 | 2/1999 |
| WO | 2010090819 A1 | 8/2010 |
| WO | 2011/12384 A1 | 10/2011 |

OTHER PUBLICATIONS

PCT International Search Report in co-pending, related PCT Application No. PCT/US2019/064324.

(Continued)

*Primary Examiner* — Melanie R Tyson
*Assistant Examiner* — Mikail A Mannan
(74) *Attorney, Agent, or Firm* — Thomas | Horstemeyer, LLP (57) ABSTRACT

In one embodiment, a system includes a small-diameter tube having an elongated body, a distal tip, and an inner lumen that extends the length of the tube, the distal tip including a magnetic element that generates a strong focal magnetic field, and a crossing wire having an elongated body and a distal tip, the distal tip of the crossing wire including a ferromagnetic element that is magnetically attracted to the distal tip of the small-diameter tube when the distal tip of the crossing wire is placed in proximity to the distal tip of the small-diameter tube so as to facilitate alignment of the distal tips.

6 Claims, 5 Drawing Sheets

(51) Int. Cl.
    *A61M 25/00*    (2006.01)
    *A61M 25/09*    (2006.01)

(56) References Cited

U.S. PATENT DOCUMENTS

| | | |
|---|---|---|
| 8,545,418 B2 | 10/2013 | Heuser |
| 9,545,263 B2 * | 1/2017 | Lenihan ............... A61M 27/002 |
| 2006/0144408 A1 | 7/2006 | Ferry |
| 2008/0065019 A1 * | 3/2008 | Heuser ...................... A61F 2/90 |
| | | 604/164.01 |
| 2009/0024089 A1 | 1/2009 | Levine et al. |
| 2010/0145147 A1 * | 6/2010 | Pinsky ............... A61M 25/0127 |
| | | 600/114 |
| 2015/0196360 A1 * | 7/2015 | Grantham ............ A61B 18/245 |
| | | 606/7 |
| 2016/0008584 A1 | 1/2016 | Root et al. |
| 2016/0310041 A1 * | 10/2016 | Jenkins .................. A61B 17/24 |
| 2017/0000519 A1 | 1/2017 | Tejani |

OTHER PUBLICATIONS

Supplementary European Search Report mailed on Aug. 22, 2022 for European Patent Application No. 19893620.5.
Ikuta et al. "Single crystal magnets". Journal of Applied Physics. vol. 54, Issue 9, pp. 5400-5403. Sep. 1983.

* cited by examiner

SYSTEMS AND METHODS FOR TREATING CHRONIC TOTAL OCCLUSION OF AN ARTERY

CROSS-REFERENCE TO RELATED APPLICATIONS

This application claims priority to co-pending PCT/US2019/064324, filed on Dec. 3, 2019, which claims priority to U.S. Provisional Application Ser. No. 62/774,377, filed Dec. 3, 2018, both of which are hereby incorporated by reference herein in their entireties.

BACKGROUND

Coronary artery disease occurs when the coronary arteries become narrowed or blocked as a result of atherosclerosis, which is the build-up of fatty deposits and plaque on the inner walls of the arteries that restricts blood flow. Without adequate blood flow, the heart is starved of the oxygen and vital nutrients it needs to function properly.

Coronary artery disease manifests itself in two opposite clinical variants. At one end of the spectrum is acute coronary syndrome (ACS) in which the narrowing of the coronary artery lumen is rapidly develops due to a thrombotic occlusion causing myocardial infarct in the absence of timely blood flow restoration. At the opposite end of the spectrum is chronic angina syndrome (CAS) with a progressive loss of lumen and consequent reduction in blood flow that causes progressive and significant ischemia in the downstream myocardial muscle, which leads to angina and chronic ischemic heart disease. In some cases, coronary narrowing can progress to complete occlusion and, through a poorly understood mechanism called collateral circulation, may still provide sufficient blood flow for maintaining viable myocardium, although with some degree of ischemia. This is the typical scenario identified as chronic total occlusion (CTO) of a coronary artery and, when present in an artery that supplies blood to a large portion of the myocardial muscle, coronary intervention may be required to restore blood flow and normal function. One such intervention involves the implantation of a coronary stent that dilates the artery at the point of the coronary lesion restricting blood flow to restore the artery's ability to deliver blood.

While coronary stent implantation is relatively straightforward for CAS, such implantation is more challenging for CTO due to the lack of ready access to the distal side of the lesion and the necessity of a coronary wire to be delivered through or around the plaque of the lesion to serve as a guide for stent deployment. One method in which a stent can be implanted in the case of a CTO lesion is a hybrid antegrade/retrograde technique referred to as reverse controlled antegrade and retrograde tracking, or reverse CART. In the reverse CART technique, a catheter and a wire are positioned at the antegrade and retrograde sides of the occlusion, respectively, and two critical steps must then be performed: lesion crossing and guide entry.

Lesion crossing requires the operator to cross the lesion with the retrograde wire while maintaining it within the lumen of the coronary artery. Once the retrograde wire has crossed the lesion, the wire must be passed into the lumen of the antegrade catheter. This step is difficult, may require additional dedicated equipment (e.g., snares), can be time consuming, and invariably adds additional radiation and contrast administration in a lengthy procedure. After the retrograde wire has been inserted into the lumen of the antegrade catheter, the wire is advanced through the entire length of the antegrade catheter so that it exits the patient's body in a process called externalization. Once externalized, the wire can be utilized to deliver the stent and the CTO intervention can be performed in similar manner to typical coronary artery stenting.

A great deal of experience and skill are necessary to perform the above-described lesion crossing. When the artery is completely occluded, the artery size and shape can only be inferred and the retrograde wire often exits the lumen and tracks along the subintimal space of the artery. Once in the subintimal space, the wire can still travel across the lesion but must re-enter the lumen of the artery on the proximal side of the lesion to enable the wire to enter the antegrade catheter. If the wire is not present within the artery lumen on both sides of the lesion (e.g., one end in the subintimal space), deployment of a stent over the wire will result in closure of the artery and blood will flow into the subintimal space and ultimately dissect the subintimal space. In addition, due to the lack of direct visualization while crossing the lesion, it is easy for the wire to exit both the lumen and the subintimal space and enter the epicardial space, which can cause life-threatening pericardial bleeding that, if not immediately addressed, can lead to patient death.

In view of the above discussion, it can be appreciated that it would be desirable to have a system and method for treating CTO that facilitates the passing of a coronary wire across a coronary lesion that has occluded blood flow for purposes of implanting a stent.

SUMMARY OF THE EMBODIMENTS

In one embodiment, a system comprises a small-diameter tube having an elongated body, a distal tip, and an inner lumen that extends the length of the tube, the distal tip including a magnetic element that generates a strong focal magnetic field; and a crossing wire having an elongated body and a distal tip, the distal tip of the crossing wire including a ferromagnetic element that is magnetically attracted to the distal tip of the small-diameter tube when the distal tip of the crossing wire is placed in proximity to the distal tip of the small-diameter tube so as to facilitate alignment of the distal tips.

In further embodiments, the small-diameter tube has an outer diameter no greater than 7 mm.

In further embodiments, the inner lumen of the small-diameter tube has a diameter no greater than 1 mm.

In further embodiments, the small-diameter tube is a microcatheter.

In further embodiments, the microcatheter comprises an inner strengthening member and a polymeric outer layer.

In further embodiments, the small-diameter tube is a dilator.

In further embodiments, the dilator is configured as a solid polymeric tube having an inner lumen and a tapered distal tip.

In further embodiments, the magnetic element comprises a single-crystal magnet.

In further embodiments, the single-crystal magnet is made of a rare-earth metal.

In further embodiments, the inner lumen of the small-diameter tube is configured to receive the crossing wire.

In further embodiments, the small-diameter tube is configured to automatically draw the distal tip of the crossing wire into the inner lumen when the distal tip of the crossing wire is placed in close proximity to the distal tip of the small-diameter tube.

In further embodiments, a stiffness of the crossing wire gradually increases near its distal tip.

In one embodiment, a small-diameter tube comprises an elongated body; a distal tip; an inner lumen that extends the length of the tube; and a magnetic element associated with the distal tip that generates a strong focal magnetic field that attracts ferromagnetic materials.

In further embodiments, the small-diameter tube has an outer diameter no greater than 7 mm.

In further embodiments, the inner lumen of the small-diameter tube has a diameter no greater than 1 mm.

In further embodiments, the small-diameter tube is a microcatheter having an inner strengthening member and a polymeric outer layer.

In further embodiments, the small-diameter tube is a dilator configured as a solid polymeric tube having an inner lumen and a tapered distal tip.

In further embodiments, the magnetic element comprises a single-crystal magnet.

In further embodiments, the single-crystal magnet is made of a rare-earth metal.

In one embodiment, a method for treating total occlusion of an artery of a patient comprises positioning a small-diameter tube on a first side of an arterial plaque causing the total occlusion, the small-diameter tube having an elongated body, a distal tip, and an inner lumen that extends the length of the tube, the distal tip including a magnetic element that generates a strong focal magnetic field; positioning a crossing wire on a second side of the arterial plaque, the crossing wire having an elongated body and a distal tip, the distal tip of the crossing wire including a ferromagnetic element; advancing the crossing wire through or around the arterial plaque toward the small-diameter tube so as to position the distal tip of the crossing wire proximate to the distal tip of the small-diameter tube, wherein the distal tip of the crossing wire is drawn to the distal tip of the small-diameter tube due to magnetic attraction; and continuing to advance the crossing wire toward the small-diameter tube until the crossing wire is drawn into the inner lumen of the small-diameter tube under the effects of the magnetic attraction.

In further embodiments, the method further comprises advancing the crossing wire thorough the inner lumen of the small-diameter tube until the distal tip of the crossing wire is positioned outside of the patient's body.

In further embodiments, the method further comprises removing the small-diameter tube from the patient.

In further embodiments, the method further comprises advancing a stent over the crossing wire and positioning the stent within the artery at the location of the plaque.

In further embodiments, the method further comprises deploying the stent at the location of the plaque to restore patency to the artery.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a system and method for treating chronic total occlusion (CTO) that facilitates the passing of a coronary wire across a coronary lesion that has occluded blood flow for purposes of implanting a stent. Examples of such systems and methods are disclosed herein. In some embodiments, a system includes a small-diameter tube having a magnetic distal tip and a crossing wire having a ferromagnetic tip. When the tip of the tube is positioned near the antegrade side of a plaque of the lesion and the tip of the crossing wire is positioned near the retrograde side of the plaque, the crossing wire can be passed through and/or around the plaque toward the tube and will naturally be drawn to the tip of the tube because of the magnetic field generated by the tip of the element. Accordingly, it is much easier to connect the crossing wire to the tube than in known procedures. In addition, the magnetic attraction naturally draws the crossing wire into an inner lumen of the tube so that the crossing wire can be inserted into, and passed through, the tube with ease. Notably, while the above-described apparatus is well suited for coronary interventions, similar apparatus can be used in substantially any situation in which a wire is to be aligned with and inserted into a tube. Therefore, the disclosed systems are not limited to use in coronary interventions.

In the following disclosure, various specific embodiments are described. It is to be understood that those embodiments are example implementations of the disclosed inventions and that alternative embodiments are possible. Alternative embodiments may include hybrid embodiments that comprise features of different embodiments. All such embodiments are intended to fall within the scope of this disclosure.

Figure 1:
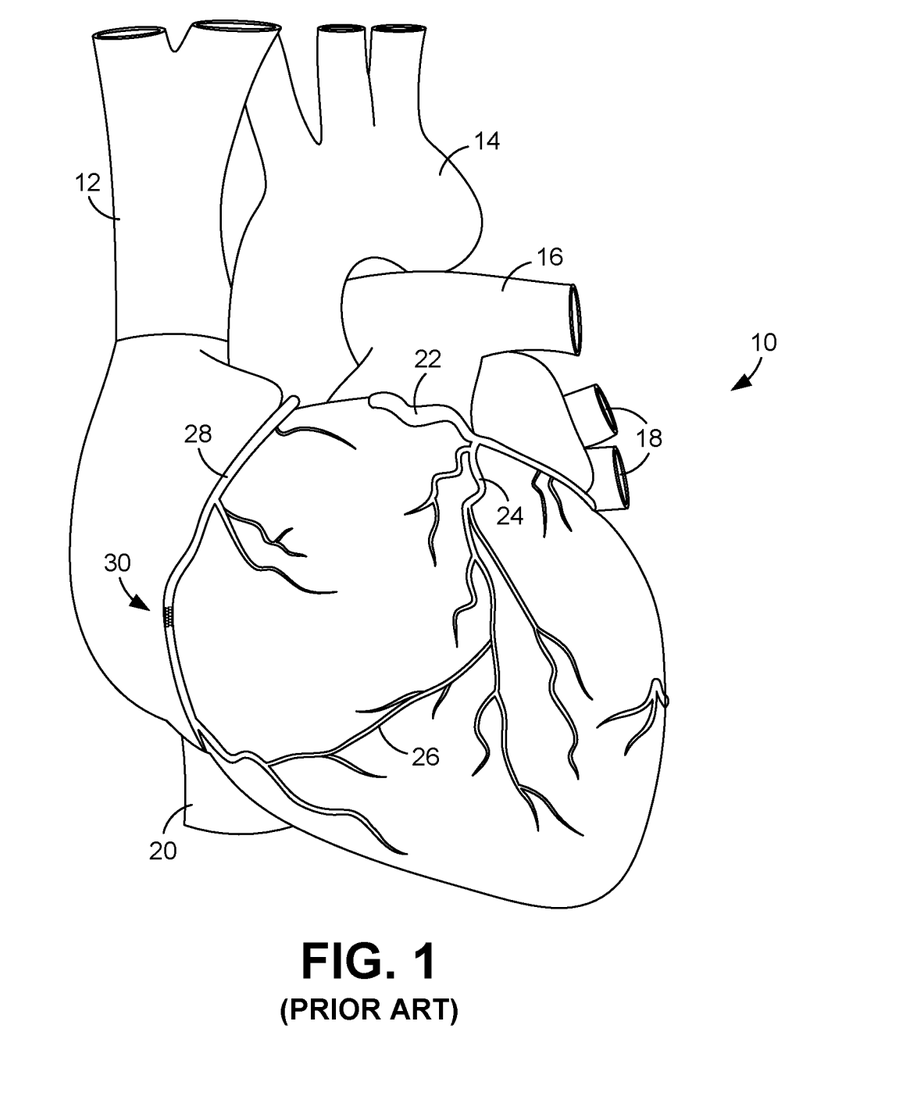
FIG. 1 is a schematic view of a human heart having a total occlusion in the right coronary artery.

FIG. 1 depicts a human heart 10. Visible in the figure are the superior vena cava 12, the aortic arch 14, the left pulmonary artery 16, the left pulmonary veins 18, the inferior vena cava 20, the left coronary artery 22, the anterior interventricular artery 24, a septal vessel 26, and the right coronary artery 28. As is also shown in the figure, there is a total occlusion 30 within the right coronary artery 28 caused by a lesion comprising a mass of plaque that blocks blood flow through the artery.

Figure 2:
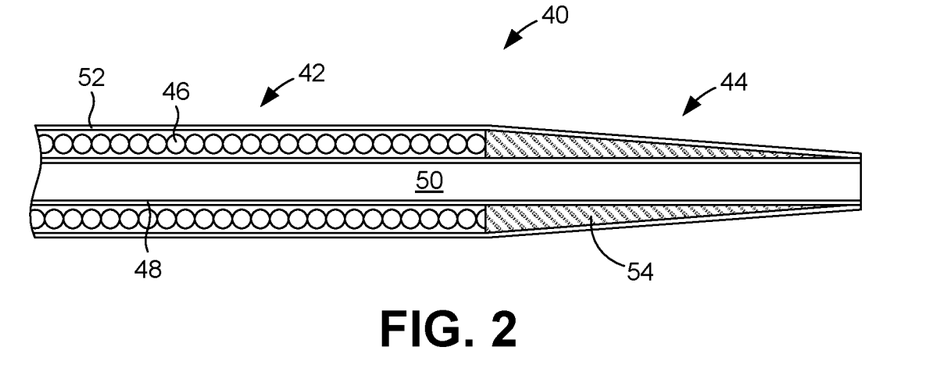
FIG. 2 is a side view of a small-diameter tube that can be used to perform a coronary intervention.
Figure 3:
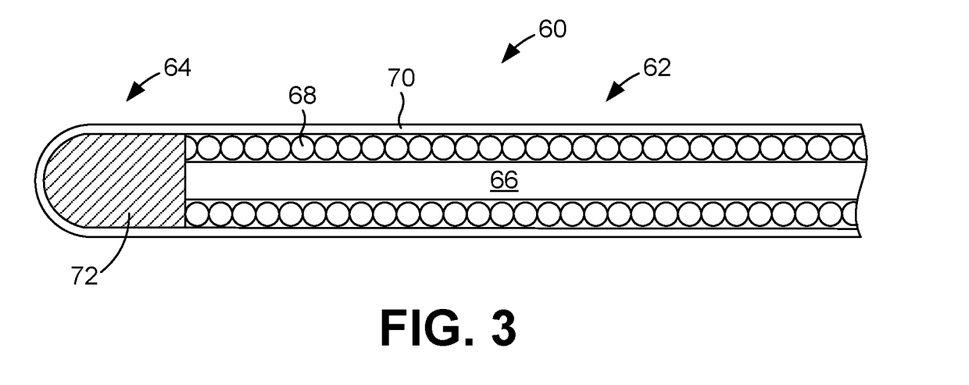
FIG. 3 is a side view of a crossing wire that can be used in conjunction with the small-diameter tube of FIG. 2 in the coronary intervention.

As described above, one common treatment for CTO and total occlusion of a coronary artery, such as that illustrated in FIG. 1, involves the implantation of a coronary stent that dilates the artery at the point of the occlusion to restore patency of the artery. FIGS. 2 and 3 illustrate devices, which comprise part of a system for treating CTO, which can be used in such a procedure. In the examples of FIGS. 2 and 3, these devices include a small-diameter tube 40 (FIG. 2) and a crossing wire 60 (FIG. 3). In the example of FIG. 2, the small-diameter tube 40 is configured as a microcatheter and will be referred to as such for the discussion of FIGS. 2-6.

As shown in FIG. 2, the microcatheter 40 has an elongated body 42 and a tapered distal tip 44. In some embodiments, the body 42 has an outer diameter of approximately 0.4 to 1.0 mm. While the body 42 of the microcatheter 40 can have various configurations, in the example of FIG. 2 the microcatheter includes an inner strengthening member 46, which can be configured as a tight metal coil. While a single coil is shown in the figure, it is noted that the body 42 can comprise multiple coils. In alternative embodiments, the inner strengthening member 46 can comprise one or more metal braids. While the microcatheter is illustrated and has been described as comprising an inner strengthening member 46, it is noted that, in other embodiments, the body 42 need not comprise any such member. Irrespective of the particular structural composition of the microcatheter 40, the microcatheter exhibits high torquability and steerability, wherein torquability refers to the response of the microcatheter to turning by the operator when navigating arteries (i.e., the ability to transmit torque from the proximal end to the distal end of the wire) and steerability refers to the ability to turn the tip of the microcatheter to navigate arteries.

The microcatheter 40 further includes an inner tube 48 that extends through both the body 42 and the distal tip 44. This tube 48 defines an inner lumen 50 that is configured to receive the crossing wire 60. In some embodiments, the inner lumen 50 has a diameter of approximately 0.3 to 0.5 mm. In addition, the microcatheter 40 can include an outer layer 52 that can, for example, be made of a polymeric material having a hydrophilic coating.

With further reference to FIG. 2, the distal tip 44 is tapered so as to have a generally frustoconical shape. In some embodiments, the tip 44 tapers from the outer diameter of the body 42 to a diameter of approximately 0.70 to 0.45 mm at its distalmost point. Provided within the distal tip 44 of the microcatheter 40 is a magnetic element 54 that facilitates connection between the microcatheter 40 and the crossing wire 60. In some embodiments, the magnetic element 54 comprises a single-crystal permanent magnet configured to generate a strong focal magnetic field. By way of example, the magnetic element 54 can be made of one or more rare-earth metals, such as neodymium.

Turning to FIG. 3, the crossing wire 60 also comprises an elongated body 62 and a rounded distal tip 64. In the example of FIG. 3, the crossing wire 60 includes a core wire 66 that can, for example, be made of a ferromagnetic material, such as iron or steel. The core wire 66 is shown surrounded by an inner strengthening member 68, in the form of a metal coil. As with the microcatheter 40, the crossing wire 60 can include one or more such metal coils, one or more metal braids, or no such strengthening members. Surrounding the crossing wire 60 is an outer layer 70 that can, for example, be made of a polymeric material having a hydrophilic coating. The body 62 of the crossing wire 60 can have an outer diameter of approximately 0.22 to 0.89 mm.

In the example of FIG. 3, the distal tip 64 is rounded so as to facilitate smooth progression of the crossing wire 60 through vessels of the body. As shown in the figure, the distal tip 64 includes an inner ferromagnetic element 72 that can be made of a ferromagnetic material, such as iron or steel. As described below, the ferromagnetic element 72, as well as the core wire 66 when present and made of a ferromagnetic material, are attracted to the microcatheter's magnetic distal tip 64 when the crossing wire 60 is placed in proximity to the distal tip. This facilitates alignment of the crossing wire 60 with the microcatheter 40, as well as insertion of the crossing wire into the microcatheter's inner lumen 50.

It is further noted that the crossing wire 60 can have variable stiffness along its length. For example, the crossing wire 60 can become gradually stiffer near its distal tip 64 to enhance its ability to pass through a plaque (FIG. 5) or pierce the endothelial membrane of the artery (FIG. 6). Such variable stiffness can be achieved in a variety of ways, such as changing material and/or thickness of the core wire 66, the inner strengthening member 68, or the outer layer 70, or applying different coatings to the exterior of the wire.

Figure 4:
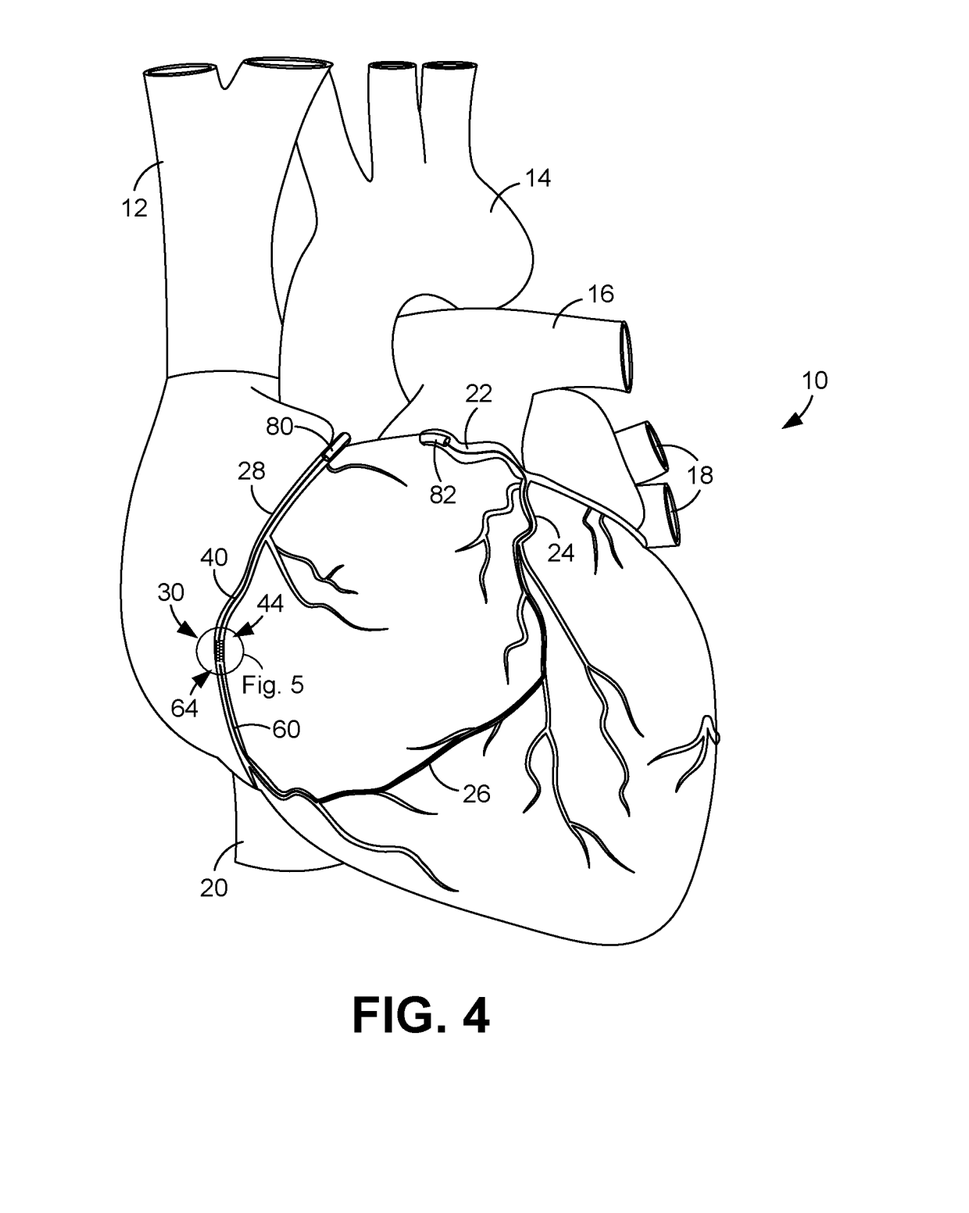
FIG. 4 is a further schematic view of a human heart having a total occlusion in the right coronary artery, illustrating a small-diameter tube positioned on the antegrade side of the occlusion and a crossing wire positioned on the retrograde side of the occlusion.

Use of the microcatheter 40 and the crossing wire 60 in a coronary intervention will now be described in relation to FIGS. 4 and 5. In the example of FIG. 4, it is assumed that there is a total occlusion 30 in the right coronary artery 28 that must be addressed. As shown in the figure, a first conventional coronary guide catheter 80 has been positioned within the ostium of the right coronary artery 28 on the antegrade side of the occlusion 30, for example, using right femoral artery access. Once the guide catheter 80 is positioned as shown in FIG. 4, a first conventional coronary guidewire (not shown) can be passed through the guide catheter and advanced through the artery 28 until the tip of the wire reaches the antegrade side of the occlusion 30. The microcatheter 40 can then be advanced over the guidewire until the tip 44 of the microcatheter is also positioned at the antegrade side of occlusion 30. At this point, the guidewire can be removed leaving the tip 44 of the microcatheter 40 next to the occlusion 30, as illustrated in FIG. 4. In some embodiments, the distal tip 44 can be placed in contact with or partially or wholly inserted into the plaque (see FIG. 5) that has caused the occlusion.

With further reference to FIG. 4, a second conventional coronary guide catheter 82 can be positioned within the ostium of the left coronary artery 22, for example, using left radial or femoral artery access. A second conventional coronary guidewire (not shown) can then be passed through the coronary catheter 82 into the left coronary artery 22. From there, the guidewire can be advanced through the left coronary artery 22, advanced into and through the left anterior descendant coronary artery 24, advanced into and through a septal vessel 26, and finally advanced into and through the right coronary artery 28 using a technique commonly known as "septal surfing." Such septal vessels connect the left anterior descendant coronary artery 24 to right coronary artery 28 and, using septal surfing, the tip of the guidewire can be advanced into the intraventricular septum to a branch of the right coronary artery 28 and, finally, into the right coronary artery in a retrograde fashion. Therefore, septal surfing enables a left anterior descendant coronary artery 24 wire to reach the distal portion of the right coronary artery 28. The distal tip of the guidewire is positioned at the retrograde side of the occlusion 30.

At this point, a coronary support catheter (not shown), such as the Turnpike® catheter by Teleflex, the Corsair® catheter by ASAHI Corsair, or the FineCross® catheter by Terumo, can be advanced over the surfed guidewire so as to position the distal tip of the coronary support catheter adjacent the retrograde side of the occlusion 30. The surfed guidewire can then be removed and replaced with the crossing wire 60 described above so that the distal tip 64 of the crossing wire is positioned at the retrograde side of the occlusion 30, as shown in FIG. 4.

Figure 5A:
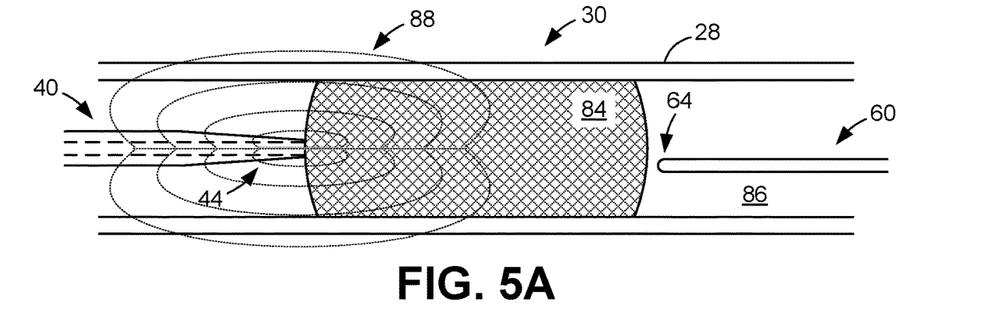
FIGS. 5A-5D are sequential schematic views illustrating a first example of alignment of a retrograde crossing wire with an antegrade small-diameter tube and insertion of the crossing wire into an inner lumen of the small-diameter tube.

FIGS. 5A-5D are detail views of the occlusion 30 within the right coronary artery 28. As shown in these figures, the occlusion 30 comprises lesion including a mass of plaque 84 that has completely occluded the inner lumen 86 of the artery 28. With reference first to FIG. 5A, the distal tip 44 of the microcatheter 40 is in contact with the plaque 84 at its antegrade side and the crossing wire 60 is positioned on the opposite, retrograde, side of the plaque. The magnetic element 54 within the distal tip 44 of the microcatheter 40 (see FIG. 2) creates a strong focal magnetic field 88 (depicted with dashed lines) that attracts ferromagnetic materials. In the example of FIG. 5, the magnetic field 88 generally extends several centimeters out from the distal tip 44, but the expanse of the magnetic field can be tuned by adjusting the size and/or configuration of the magnetic element 54.

Figure 5B:
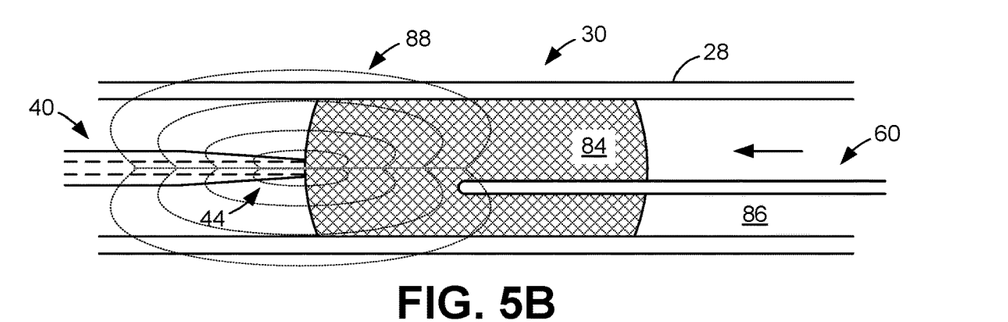
Figure 6A:
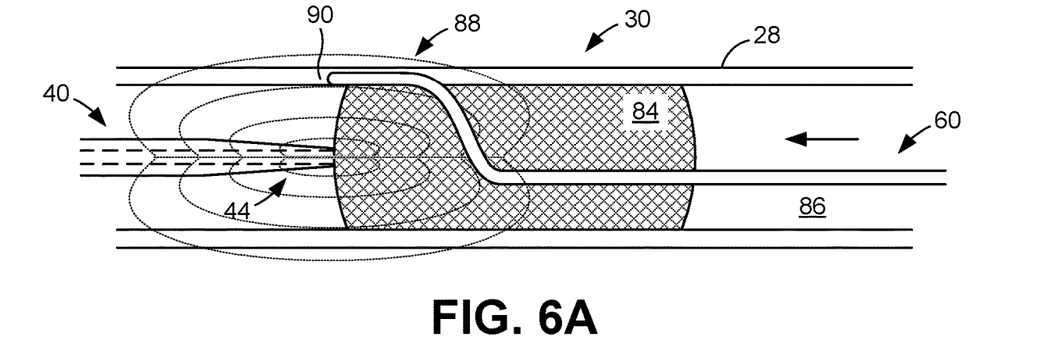
FIGS. 6A and 6B are sequential schematic views illustrating a second example of alignment of a retrograde crossing wire with an antegrade small-diameter tube and insertion of the crossing wire into an inner lumen of the small-diameter tube.
Figure 6B:
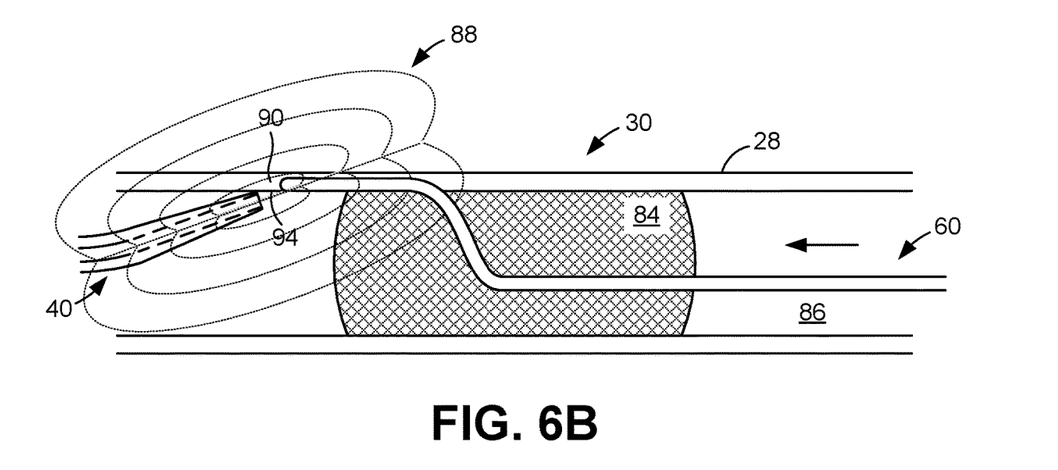

Referring to FIG. 5B, the crossing wire 60 is advanced (in the direction of the horizontal arrow) into the plaque 84 so as to move it closer to the microcatheter 40. In the example of FIG. 5, the crossing wire 60 is advanced through the middle of the plaque 84. As is apparent in FIG. 5B, the crossing wire 60 is not in precise alignment with the microcatheter 40. Such misalignment would normally increase the difficulty in connecting the crossing wire 60 to the microcatheter 40. As is also apparent in the figure, the distal tip 64 of the crossing wire 60 has just entered the magnetic field 88 created by the microcatheter 40.

Figure 5C:
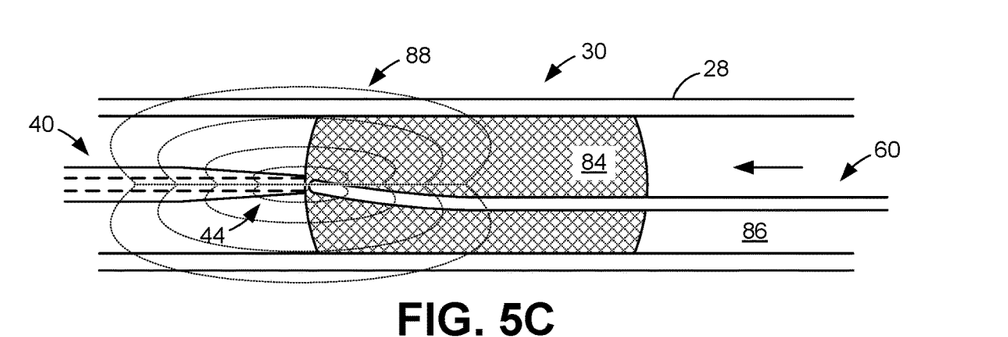

With reference next to FIG. 5C, as the crossing wire 60 is advanced further toward the microcatheter 40, and further into the magnetic field 88, the crossing wire 60 is pulled toward the distal tip 44 of the microcatheter 40 because of the ferromagnetic element 72 contained within the distal tip 64 of the crossing wire and, when present, the ferromagnetic core wire 66 (see FIG. 3). Accordingly, the distal tip 64 of the crossing wire 60 naturally and automatically aligns itself with the distal tip 44 of the microcatheter 40, greatly simplifying the alignment process for the surgeon.

Figure 5D:
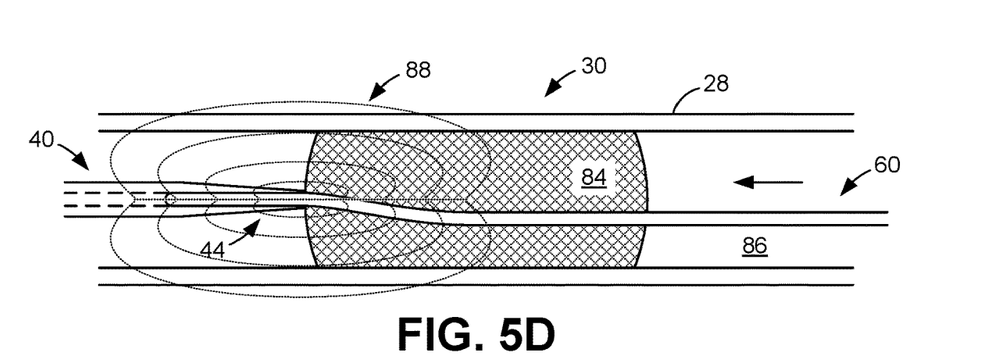

Referring now to FIG. 5D, as the crossing wire 60 is further advanced, it enters the inner lumen 50 of the microcatheter 40 so that the crossing wire can be fed through the microcatheter and externalized. Once the crossing wire 60 has been fully passed through the microcatheter 40 so as to extend outside of the patient's body, the microcatheter 40 can be removed, thereby leaving the crossing wire within the right coronary artery 28 and extending through the plaque 84 with the wire remaining within the lumen 86 of the right coronary artery 28. The crossing wire 60 can then be used as conventional guidewire to deliver a stent to the plaque 84 so that the stent can be deployed to restore patency to the right coronary artery 28.

In some cases, the crossing wire 60 may not pass straight through the plaque 84 and may instead be deflected into the subintimal space of the artery 28. FIG. 6 illustrates an example of this. As is shown in FIG. 6A, about halfway through the plaque 84, the crossing wire 60 was deflected upward (in the orientation of the figure) so that its tip enters the subintimal space 90 of the artery 28. Such deflection may occur due to the composition of the plaque 84, which may comprise dense calcium or organized thrombotic material that is difficult to penetrate. In such a circumstance, the subintimal space 90 provides less resistance, which results in the crossing wire 60 passing through that space as it is advanced instead of the plaque 84.

With reference to FIG. 6B, as the crossing wire 60 is advanced through the subintimal space 90, it eventually passes the plaque 84 and enters deep into the magnetic field 88 of the microcatheter 40. As before, the tip 44 of the microcatheter 40 and the tip 64 of the crossing wire 60 are automatically drawn toward each other by magnetic attraction between them. In some cases, the microcatheter 40 can be withdrawn slightly and re-advanced to facilitate bringing the tip 44 of the microcatheter into close proximity to the tip 64 of the crossing wire 60, as depicted in FIG. 6B. As the endothelial membrane 94 of the artery 28 that separates the subintimal space 90 from the artery lumen 86 is only a few microns thick, the tip 64 of the of the crossing wire 60 can easily pierce through the membrane as it is advanced within the magnetic field 88 to enable the tip of the crossing wire 60 to contact and enter the microcatheter 40.

It is noted that various changes can be made to the microcatheter, the crossing wire, as well as the surgical procedure without departing from the disclosed inventive concepts. For example, instead of comprising a ferromagnetic material that is attracted to the magnetic element of the microcatheter, the crossing wire can comprise a further magnetic element having a polarity that is opposite that of the polarity of the catheter's magnetic element. This alteration may increase the strength of the magnetic attraction between the microcatheter and the crossing wire. In addition, while an antegrade microcatheter and a retrograde crossing wire have been described, the positions of these two devices can be reversed. Furthermore, while a microcatheter and a crossing wire have been described, the crossing wire can be replaced with a further catheter having a ferromagnetic element in its distal tip and the two catheters (with opposite polarity) could connect to each other. Moreover, one or both of the tips of the microcatheter and the crossing wire can be provided with radiopaque markings that aid the operator in determining their relative positions.

Figure 7:
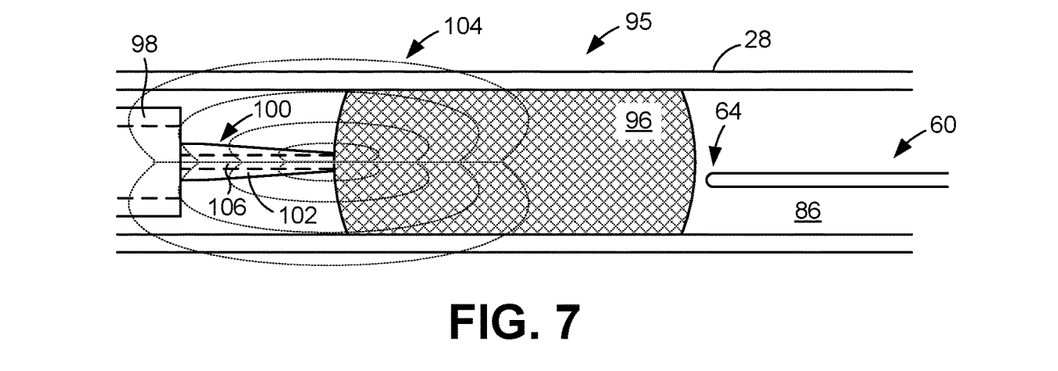
FIG. 7 is a schematic view illustrating a third example of alignment of a retrograde crossing wire with an antegrade small-diameter tube and insertion of the crossing wire into an inner lumen of the small-diameter tube.

In yet another alternative, the small-diameter tube used to receive the crossing wire need not be a microcatheter. Specifically, in cases in which the occlusion is a proximal occlusion located near the ostium of the artery, the small-diameter tube can comprise a hollow dilator having a relatively larger diameter that is advanced through the conventional coronary guide catheter. FIG. 7 illustrates an example of this. In this example, there is an occlusion 95, also comprising a mass of plaque 96, within the right coronary artery 28. In this case, however, the occlusion/plaque is positioned within the artery 28 near its ostium. Instead of a microcatheter, a conventional coronary guide catheter 98 is positioned near the plaque 96 so that a dilator 100 can be positioned immediately adjacent the antegrade side of the plaque (or within the plaque). As with the microcatheter, the dilator 100 comprises a tapered distal tip 102 in which a magnetic element (not visible) is contained that facilitates connection between the dilator and the crossing wire 60. As before, the magnetic element can comprise a single-crystal permanent magnet configured to generate a strong focal magnetic field 104. By way of example, the magnetic element can occupy the last 50 mm of the dilator 100. Unlike the microcatheter, however, the construction of the dilator 100 can be relatively simple. In some embodiments, the dilator 100 can simply comprises a hollow polymeric element having a magnetic element at its tip 102. As such, the dilator 100 can be more easily and inexpensively produced as compared to the microcatheter. By way of example, the outer diameter of the dilator 100 can be approximately 1.6 to 6.4 mm) and its inner lumen 106 can have a diameter of approximately 0.3 to 1 mm.

The apparatus of FIG. 7 can be used in the same manner as that shown in FIGS. 5 and 6. Specifically, the crossing wire 60 is advanced into the plaque 96 so as to move it closer to the dilator 100. As the tip 64 of the crossing wire 60 nears the tip 102 of the dilator 100, the crossing wire is magnetically attracted to the dilator and ultimately enters an inner lumen 106 of the dilator. The crossing wire 60 can then be externalized and used as a guidewire for a stent.

Experiments were performed using cooked turkey tissue to evaluate the functionality of the disclosed systems and the ability of a magnetic small-diameter tube to attract a crossing wire through the tissue. In the experiments, the back end of a Boston Scientific (Marlborough, MA) Choice™ PT Extra-Support Guidewire was used as the crossing wire. This guidewire comprises a stainless steel core that is surrounded by a hydrophilic coating and is available with an outer diameter of 0.014 in or 0.035 in. The distalmost 3 to 5 cm further includes a ferromagnetic element that provides favorable properties to the distal end of the guidewire. The proximal end of the guidewire includes a nitinol core surrounded by a hydrophilic coating to ensure trackability through tortuous vessels and to facilitate septal vessel navigation. Notably, variable tip loads can be achieved by increasing core stiffness in the distal portion of the guidewire to increase the ease through which the guidewire can be passed through a lesion.

N52 nickel-plated neodymium rings (K&J Magnetics, Pipersville, PA, USA: R422-N52) having an axial magnetization direction were obtained to create a magnetic tubular structure that emulates the distal tip of the small-diameter tube. Each magnetic ring weighed 0.57 g and had a thickness of 3.1 mm, an outer diameter (OD) of approximately 6.3 mm (equivalent to 19 French (Fr)), and an inner diameter (ID) of approximately 3 mm (equivalent to 9 Fr). Ten of the neodymium rings were aligned to form the magnetic tubular structure. The tubular structure was secured to the surface of cardstock, which was marked at 10-mm intervals to enable the determination of the distance at which the guidewire became biased towards the structure.

Two slices of cooked turkey tissue (~3 mm thick each) were stacked on top of each together and were positioned at the end of the magnetic tubular structure such that the guidewire would need to pass through at least 6 mm of tissue to access the center of the tubular structure. The guidewire was blindly moved towards the tissue by an operator. The operator began to experience tactile feedback as the tip of the guidewire was positioned 3 cm from the tubular structure. At 3 cm from the tubular structure, the guidewire began to deflect as evidenced by vibrations that were visibly observed as the guidewire entered the magnetic field.

Next, a 0.014 in passage was formed through the turkey slices to emulate a microchannel such as that which is commonly formed through a plaque within a chronically occluded artery. Due to the magnetic field generated by the magnetic tubular structure, the operator was able to effortlessly pass the guidewire through through the passage. Then, the guidewire was actively captured by the magnetic field, which pulled the guidewire into and through the tubular structure. The guidewire was withdrawn and the operator was able to repeat the above process with the same results.

Next, a gelatin medium was obtained to simulate organized clot resistance to a wire and small-diameter tube manipulation and interaction. A similar experiment was then performed using the gelatin medium. A microcatheter was used to provide structural support to the guidewire as it was advanced. Although the gelatin reduced the ease with which the guidewire could be navigated to the tubular structure, the magnetic field biased the wire in the direction of the tubular structure.

Next, the reverse procedure was performed, in which the guidewire was inserted into one side of the gelatin medium and the magnetic tubular structure was manipulated on the other side of the medium. The guidewire was embedded within the gelatin medium to a depth of approximately 0.84 to 2.11 cm. As before, the magnetic cylindrical structure was able to magnetically attract the tip of the guidewire even though there was no direct physical contact. Ultimately the strength of the magnetic attraction between the tubular structure and the guidewire was sufficient to allow the united portions to be extracted from the gelatin. This demonstrates the ability of the cylindrical tube (and therefore the small-diameter tube) to generate a magnetic field of sufficient strength to enable the detection and attraction of a limited mass of ferromagnetic material at the inner core of a crossing wire.

It is reiterated that the disclosed systems are not limited to use in coronary interventions. For example, the systems can be used in procedures such as: false or true lumen re-entry during aortic or large artery dissections; to address chronic occlusion through contralateral access, for example in the iliac artery, superficial femoral artery, infra-popliteal vessel, or subclavian veins; revascularization of infra-popliteal arteries; recanalization for chronic total occlusion of femoral-popliteal artery in patients with peripheral arterial disease; angioplasty/venoplasty and clot recanalization for chronic deep vein thrombosis patients; percutaneous arteriovenous fistula creation; biliary tree occlusion to guide evacuation of retained products of conception (ERPC) for retrograde navigation of the biliary tree with the initial access done percutaneously by accessing the gallbladder, among others.

The invention claimed is:

1. A method for treating total occlusion of an artery of a patient, the method comprising:
   positioning a small-diameter tube on a first side of an arterial plaque causing the total occlusion, the small-diameter tube having an elongated body, a distal tip, and an inner lumen that extends the length of the tube, the distal tip including a magnetic element that generates a strong focal magnetic field;
   positioning a crossing wire on a second side of the arterial plaque, the crossing wire having an elongated body and a distal tip, the distal tip of the crossing wire including a ferromagnetic element;
   advancing the crossing wire through or around the arterial plaque toward the small-diameter tube so as to position the distal tip of the crossing wire proximate to the distal tip of the small-diameter tube, wherein the distal tip of the crossing wire is drawn to the distal tip of the small-diameter tube due to magnetic attraction;
   continuing to advance the crossing wire toward the small-diameter tube until the crossing wire is drawn into the inner lumen of the small-diameter tube under the effects of the magnetic attraction; and
   advancing the crossing wire through the inner lumen of the small-diameter tube until the distal tip of the crossing wire is positioned outside of the patient's body.

2. The method of claim 1, further comprising removing the small-diameter tube from the patient.

3. The method of claim 2, further comprising advancing a stent over the crossing wire and positioning the stent within the artery at the location of the plaque.

4. The method of claim 3, further comprising deploying the stent at the location of the plaque to restore patency to the artery.

5. The method of claim 1, wherein the magnetic element is tubular.

6. The method of claim 1, wherein the magnetic element is frustoconical.

* * * * *